(12) United States Patent
Gong et al.

(10) Patent No.: US 8,758,542 B2
(45) Date of Patent: Jun. 24, 2014

(54) FILTER

(75) Inventors: Haiqing Gong, Singapore (SG);
Longqing Chen, Jeddah (SA)

(73) Assignee: Nanyang Technological University, Singapore (SG)

(*) Notice: Subject to any disclaimer, the term of this patent is extended or adjusted under 35 U.S.C. 154(b) by 196 days.

(21) Appl. No.: 13/260,235

(22) PCT Filed: Nov. 9, 2009

(86) PCT No.: PCT/SG2009/000452
§ 371 (c)(1),
(2), (4) Date: Sep. 23, 2011

(87) PCT Pub. No.: WO2010/110739
PCT Pub. Date: Sep. 30, 2010

(65) Prior Publication Data
US 2012/0024775 A1    Feb. 2, 2012

(30) Foreign Application Priority Data
Mar. 25, 2009  (SG) ............... 200902061-1

(51) Int. Cl.
*B32B 37/15*  (2006.01)
*B32B 38/10*  (2006.01)
(52) U.S. Cl.
USPC ........... 156/245; 156/155; 156/235; 156/249; 156/275.5; 264/317; 264/425; 264/496
(58) Field of Classification Search
USPC ............... 156/152; 264/317, 413, 425, 496
See application file for complete search history.

(56) References Cited

U.S. PATENT DOCUMENTS

| | | | |
|---|---|---|---|
| 4,279,752 A | 7/1981 | Sueoka et al. | |
| 4,802,942 A | 2/1989 | Takemura et al. | |
| 4,872,888 A * | 10/1989 | Ehrfeld et al. | ........... 210/500.35 |
| 5,238,613 A | 8/1993 | Anderson | |
| 5,279,739 A | 1/1994 | Pemawansa | |
| 5,336,645 A | 8/1994 | Rittler | |
| 6,251,208 B1 * | 6/2001 | Serizawa et al. | ............. 156/232 |
| 6,540,953 B1 | 4/2003 | Lee et al. | |
| 8,263,129 B2 * | 9/2012 | DeSimone et al. | ........... 424/489 |
| 2003/0031924 A1 | 2/2003 | Lee et al. | |
| 2005/0204920 A1 | 9/2005 | Hong et al. | |
| 2006/0249886 A1 * | 11/2006 | Chao et al. | .................... 264/496 |
| 2008/0001317 A1 | 1/2008 | Tokarski et al. | |

FOREIGN PATENT DOCUMENTS

| | | |
|---|---|---|
| CN | 1338970 A | 3/2002 |
| CN | 101274227 | 10/2008 |
| EP | 0 523 331 A1 | 1/1993 |
| EP | 1 457 252 A1 | 9/2004 |

(Continued)

OTHER PUBLICATIONS

International Patent Application No. PCT/SG2009/000452: International Search Report dated Feb. 12, 2010, 9 pages.

(Continued)

*Primary Examiner* — William Bell
(74) *Attorney, Agent, or Firm* — Baker & Hostetler LLP (57) ABSTRACT

The present invention relates to a membrane filter comprising a plurality of pores of substantially the same size. The membrane filter may be supported by at least one support (e.g. in the form of a support grid) and is able to handle a large flux and pressure in use. The invention also relates to a method of fabrication of such a filter membrane using a solvable mold.

8 Claims, 9 Drawing Sheets

(56) References Cited

FOREIGN PATENT DOCUMENTS

| JP | H1162791 A | 6/1989 |
| WO | WO 01/41905 A1 | 6/2001 |
| WO | WO 02/34819 | 5/2002 |
| WO | WO 2005/108476 A1 | 11/2005 |
| WO | WO 2010/110739 A1 | 9/2010 |

OTHER PUBLICATIONS

European Patent No. 2411129: Supplementary European Search Report dated Feb. 27, 2013, 7 pages.
Chinese Patent Application No. 200980158364: First Office Action dated Aug. 5, 2013, 16 pages.

* cited by examiner

FILTER

CROSS-REFERENCE TO RELATED APPLICATIONS

This application is the National Stage of International Application No. PCT/SG2009/000452, filed Nov. 26, 2009, which claims priority to Singapore Application No. 200902061-1, filed Mar. 25, 2009, the disclosure of which is incorporated herein by reference in its entirety.

FIELD OF THE INVENTION

The present invention relates to a filter, for filtration of fluids or gases. In particular, the filter device is for separation of particles from either fluid or gas. The invention also relates to the fabrication of a filter.

BACKGROUND OF THE INVENTION

In environmental, physical, chemical and microbiological studies, filtration is often used to concentrate small particles (e.g. microbial cells) suspended in minute concentration in fluids or gases. In general, it may be necessary to separate and concentrate small particles according to the particle dimension. Further, it is desirable to rapidly and completely capture these small particles on a filter.

Traditional particle filters consisting of cellulose ester are marketed with an average pore size. The user will usually select a suitable filter to use based on the average pore size of the filter but in general, these filters do not have uniform sized pores but have varied pore sizes. The actual pore sizes lie within a scale range of the average pore size. Accordingly, it may difficult to achieve a complete separation of small particles as these particles are trapped only by a fraction of pores equal to or smaller than the stated average pore size but may not be trapped efficiently by pores larger than the average pore size. Particles (such as microbial cells) may also have a tendency to adhere to the cellulose ester filter after being trapped or be trapped deep within the pores of the ceullulose ester filter. In filtration methods further requiring subsequent collection of trapped particles (for concentration and/or for further identification/analysis), the retrieval or elution of the particles from such cellulose may not be complete.

Other filters include thin polymer filters (usually polycarbonate), which have an irregular array of pores on the surface, a fairly low total area of pores and limited overall filter size. These filters are normally employed for single use only and are usually not strong or reliable enough for repeated use.

Particle filters with uniform pore sizes have been described. For example, inorganic microfiltration membranes with a pore size down to 0.1 μm were fabricated using laser interference lithography and silicon micro machining technology. This filtration membrane was fabricated using silicon nitride deposited on a silicon wafer as a support substrate. These membranes were reported to have small flow resistance due to a thickness smaller than the pore size, a smooth surface, high porosity, narrow pore size distribution, large flux, low trans-membrane pressures and relatively insensible to fouling. However, the fabrication involved numerous process steps and the use of expensive equipment results in a high production costs. Further, the thin membrane (<1 μm) allows only low working pressure (<2 bar) and the lack of choice of membrane material (limited to nitride) also limits the application of this filtration membrane.

A polymer through-hole membrane with high aspect ratios may also be fabricated by nano-imprinting using metal molds. The metal molds were prepared by a replication process using an anodic porous alumina template.

With this technique, different resins can be used to make the through-hole membrane with a diameter of 250 nm. However, the use of the alumina template restricts the pore density and pore size of the membrane and the method typically produces membranes with a pore diameter down to 100 nm only. Further, as the membrane is thin, it is readily torn or damaged when being released from the mold. Increasing the thickness of the polymer membrane may result in larger friction and adhesion forces between the membrane and the metal mold and thus it is also difficult to detach the mold from a thicker polymer.

Phase separation micromolding is also a suitable method to prepare a polymeric filter with polyethersulfone (PES) but the fabrication method can be challenging. For example, although chemical resistance and mechanical properties of PES membranes is suitable for filtration, the fabrication method may result in an increase in pore size during the shrinkage stage and membrane folding and tearing during release from the mold. In addition, if a blend of polymers is used, the ratio of the blend is crucial to the integrity of the membrane during release from the mold.

Fabrication of a microfilter using an excimer laser is also possible but the formation of debris and ridges during the cutting process reduces the quality of the filter surface. In addition, the equipment (laser excimer) is expensive and the process is time-consuming.

SU-8 submicrometric filters fabricated by UV interference lithography are suitable for biological applications, but the thinness of the membrane (typically in the order of 100 nanometers) is not suitable for a filtration system where the filter is subjected to substantial pressure.

It is therefore desirable to further improve on fabrication methods of filters.

SUMMARY OF THE INVENTION

The present invention relates to a filter device and a method of preparing a filter device. According to a first aspect, the invention provides a method for preparing a filter device:

(i) providing a solvable mold comprising an array of pillars of substantially the same size;

(ii) depositing a curable resin layer on the solvable mold, curing the resin to form a membrane filter comprising an array of pores of substantially the same size in contact with the solvable mold;

(iii) contacting at least a portion of a first surface of the membrane filter away from the mold to a first support; and (iv) dissolving away the solvable mold leaving the membrane filter in contact with the support.

At least a portion of the first surface of the membrane filter away from the mold may be bonded to the first support. With the bonded support, the membrane filter may be more resistant to damage.

The method may further comprise the step of bonding at least a portion of second surface of the membrane filter to a second support. With a second bonded support, the membrane filter may be even more resistant to damage.

According to another aspect, the present invention provides a filter device for filtering fluids or gas comprising a membrane filter comprising a plurality of pores of substantially the same size and at least a portion of one surface bonded to a support. Alternatively, a portion of each surface may be bonded to a support. The support may be substantially rigid and/or permeable to fluid or to gas.

A more complete understanding of the present invention, as well as further features and advantages of the present invention, will become apparent from the detailed description and figures below.

BRIEF DESCRIPTION OF THE FIGURES

Reference numerals indicated in the drawings and referred to in the detailed description are intended for illustrative purposes only and should not be construed as limited to the particular structure indicated in the drawings.

DEFINITIONS

Curing refers to a process of hardening or solidifying a substance, for example a polymer material.

Porosity refers to the proportion of pore area per unit surface area.

DETAILED DESCRIPTION OF THE INVENTION

The method of preparing the filter itself is described below. For each filter, a solvable pillar mold may first be prepared and is subsequently used for casting the membrane filter. The membrane filter may be cast by depositing a curable resin onto the solvable mold. After curing, a portion of the surface of the membrane away from the mold is contacted to a first support. The solvable mold may then be dissolved with a suitable solvent leaving the membrane in contact with the first support. The first support may be bonded to a portion of the surface of the membrane.

Dissolving the solvable mold eliminates the need to physically release the membrane filter from the mold. The method of the invention may accordingly reduce damage such as tearing, crimping and/or curling of the membrane filter during fabrication. The membrane filter also has a substantially smooth, flat surface.

A second support may optionally be bonded to a portion of the second surface of the membrane filter to further strengthen the filter.

The portion(s) of the first and/or second surfaces for bonding may comprise the circumferential or peripheral portion of the membrane. This circumferential or peripheral portion may be in the form of a ring surrounding the central area comprising pores.

The membrane filter may be sandwiched between two supports, in particular when in use. Alternatively, only the first surface of the membrane filter may be bonded to the first support for strengthening the membrane filter. This may reduce damage to the membrane filter, especially during use when the filter may be subject to a high flux and a large flow pressure.

Alternatively, substantially the entire first and/or second surface may be bonded to support(s). In particular, either of or both the supports may be substantially rigid but permeable to fluid or gas, so that in use, fluid and gas can flow through the first support to the membrane filter and flow from the membrane filter through the second support. The permeability of the support to fluid or gas may be due to openings in the support. In particular, the openings are larger than the pores of the membrane filter. The support may be made of any substantially rigid material, for example, metal, plastic, paper or ceramic.

According to one exemplary embodiment, the present invention provides a filter device for filtering fluids or gas comprising a membrane filter comprising a plurality of pores of substantially the same size and with at least a portion of one surface bonded to a support. The membrane filter comprises a high porosity, for example, in the range of 5% to 80%. The plurality of pores of the membrane filter is arranged in a substantially regular array, corresponding to the pillar mold used during fabrication.

The filter device may be used for trapping particles from either fluid or gas. For example, the filter device may be used for trapping organisms from water samples, such as bacteria, algae, fungi or eukaryotic cells. In particular, the filter device may be used for trapping pathogens, for example, *Cryptosporidium*. The filter device of the present invention may possess the following features: (i) membrane filter with substantially identical pore size for efficient trapping of particles, (ii) substantially smooth surface of membrane filter which may reduce fouling of filter, (iii) capacity to handle large flux and high pressure. In particular, the size of the pores in the membrane filter may be precisely fabricated to suit the size of the particles to be trapped. Further, the fabrication process may be considered a low cost fabrication process, resulting in substantial cost savings in the manufacture process.

Organisms and/or particles trapped by the membrane filter of the invention may be recovered from the membrane filter for further manipulation and/or analysis. Organisms and/or particles may be recovered from the membrane filter by directing a flow of eluent to dislodge or flush out trapped organisms and/or particles (back-flushing) and using the eluent comprising organisms and/or particles for further manipulation and/or analysis. Alternatively, the membrane filter may be immersed in a liquid with agitation (e.g. tangential or lateral shaking) to dislodge the organisms and/or particles, and subsequently using the liquid comprising organisms and/or particles for further manipulation and/or analysis.

Having now generally described the invention, the same will be more readily understood through reference to the following examples which are provided by way of illustration, and are not intended to be limiting of the present invention.

EXAMPLE 1

Fabrication of Solvable Pillar Mold

Figure 5:
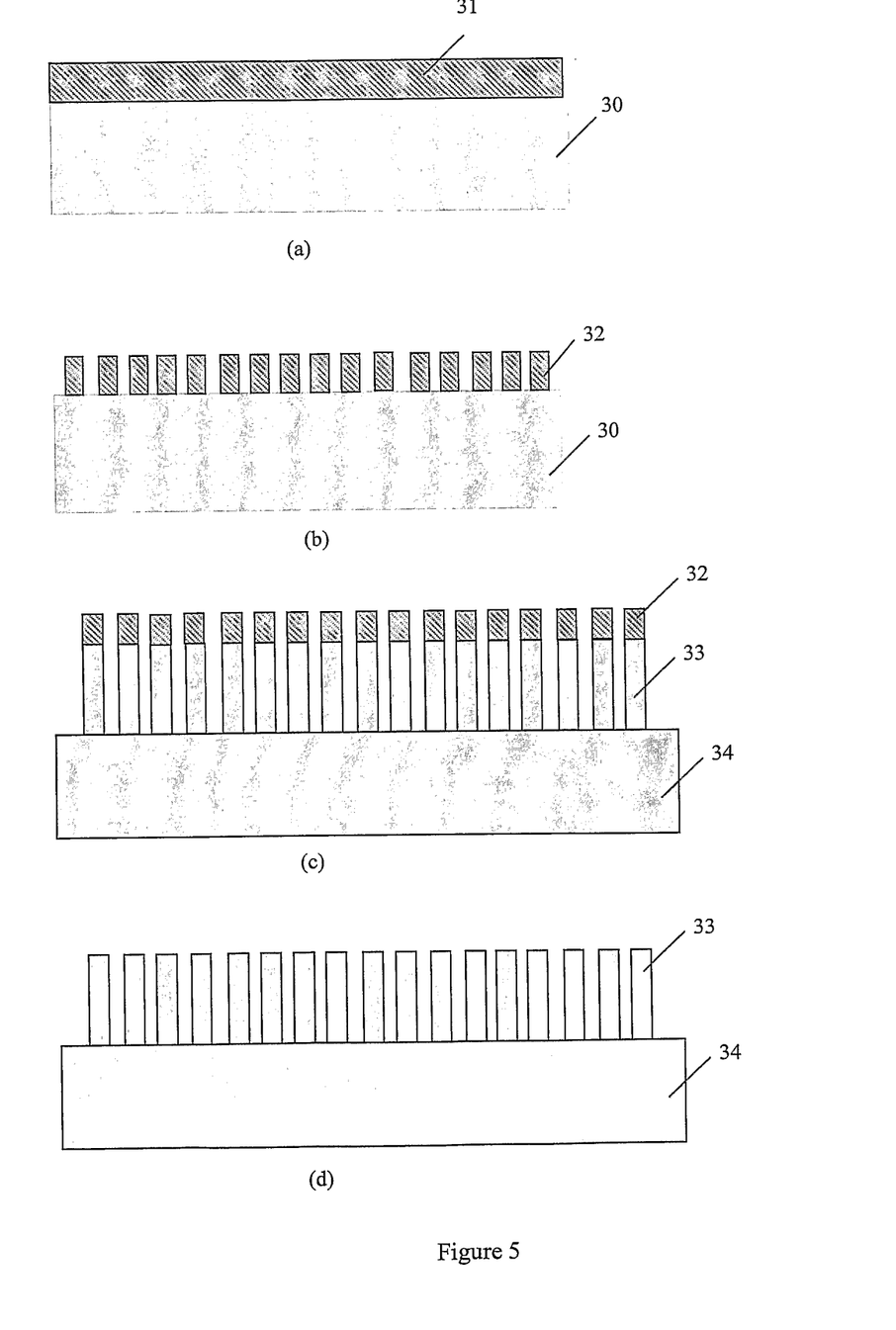
FIG. 5 illustrates a method of preparing a membrane filter.
Figure 8:
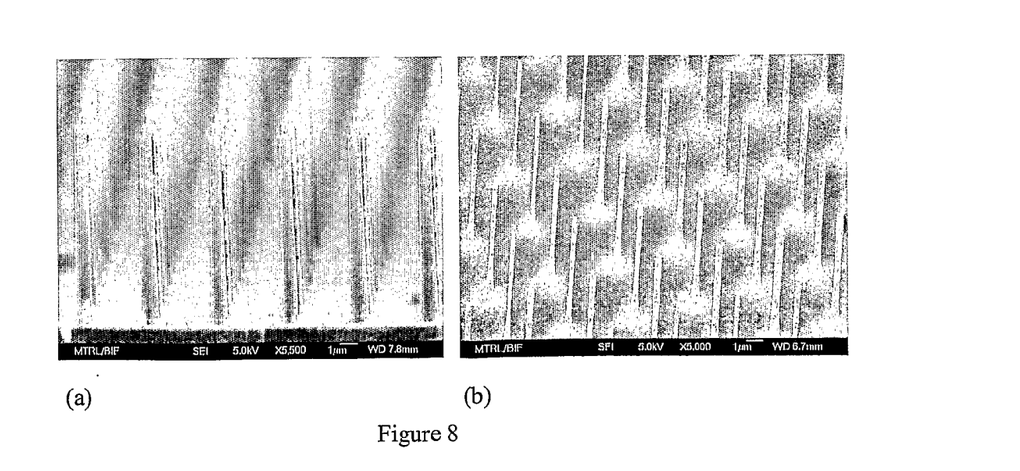
FIG. 8(a) depicts an example of a silicon master mold and FIG. 8(b) depicts an example of a silicon master mold with thinned pillars.

The fabrication of the solvable pillar mold precedes the fabrication of the membrane filter. The solvable pillar mold is itself a replica of a master pillar mold. This master pillar mold may be fashioned by any conventional fabrication method method. In one exemplary embodiment, the master pillar mold comprises a silicon pillar mold. The silicon pillar mold is fabricated from 4" silicon wafer 30 and the fabrication process is schematically illustrated in FIG. 5(a) to (f). The silicon wafer 30 may first be cleaned in piranha solution (98% $H_2SO_4$+30% $H_2O_2$) so as to remove any organic residue or other undesired impurities from the silicon wafer. As shown in FIG. 5(a), a suitable photoresist layer 31 may then be deposited onto a surface of the silicon wafer 30. The photoresist layer 31 may be any suitable photoresist material including but not limited to AZ7220, AZ9260 or AZ4214. As shown in FIG. 5(b), photolithography may be performed using a suitable mask aligner (e.g. Karl-SUUS MA6) and a resist pattern 32 was patterned on the silicon wafer. As an example, a resist dot array with dot diameter of 1.5 μm separated by a space of 2.5 μm may be patterned on the silicon wafer. The resist pattern 32 was then used as an etching mask for silicon etching to form high aspect ratio pillars 33 (FIG. 5(c)). The etching may be performed using any process capable of generating a high aspect ratio structure including but not limited to STS deep reactive etching, ICP deep reactive etching focus or ion bean milling. As the silicon etching does not extend to the entire wafer, a base 34 is formed. As an example, the pillars may be about 1 μm in diameter and 12 μm in height. As shown in FIG. 5(d) the residual photoresist material was removed from the tops of pillars 33. An embodiment of a silicon master mold is shown in FIG. 8(a).

In optional step as shown in FIG. 5(e), the diameter of the pillars may be further reduced. This was performed by thermal oxidation and HF etching. Thermal oxidation was performed in an oxidation furnace at 1100° C. During this process, the external surface of the silicon pillar will be covered by a silicon oxide layer 35. The thickness of the silicon oxide layer 35 was controlled by controlling the oxidation time. As a result of the oxidation, thinner silicon pillars 36 may be produced. An embodiment of a silicon master mold with thinned pillars is shown in FIG. 8(b). The diameter of the pillars may thus be reduced to sub-micrometre or nanometre dimensions. As shown in FIG. 5(f), the silicon oxide layer may be removed using buffered oxide etching (BOE) solution (BOE 7: 1 or Ammonium Fluoride: HF=7:1). It can be understood that the diameter of the thinned silicon pillars 36 is dependent and may be controlled by the oxidation time. This silicon pillar mold may then be used as a master mold to replicate interim blind hole molds or through hole molds.

As shown in FIG. 5(g), an interim blind hole mold 37 may be replicated from the master silicon pillar mold. In an exemplary embodiment, the interim blind hole mold may be fabricated using a curable silicon resin, e.g. polydimethylsiloxane (PDMS). The interim blind hole mold may then be used to replicate a solvable pillar mold. It can be readily understood that the master mold may be re-used to make a plurality of interim blind hole molds. Each interim blind hole mold 37 may also be reused to make a plurality of solvable pillar molds. In this way, many solvable pillar molds may be replicated from each master silicon pillar mold.

In FIG. 5(h), the fabrication of the solvable pillar mold 38 from the interim blind hole mold 37 is illustrated. The solvable pillar mold 38 may be fabricated from any material that can dissolve in water or other solvent. In particular, the solvable pillar mold may dissolve in water or other solvent at a temperature less than 100° C. More in particular, the solvable pillar mold 38 may dissolve in water or other solvent at room temperature. The solvable pillar mold 38 may be made from any suitable material, for example polymers including but not limited to polyvinylalcohol (PVA), polymethyl methacrylate (PMMA), photo resist (e.g. AZ9260), gels (e.g. agarose, gelatine), starch or wax. The solvable mold 38 is then released from the interim blind hole mold 37. The solvable pillar mold 38 is generally for single use only (see Example 2).

EXAMPLE 2

Fabrication of Membrane Filter

As illustrated in FIG. 5(i), a layer of curable resin 39 is deposited onto the solvable mold 38 The curable resin may be any polymer material with suitable mechanical properties, chemical stability and biocompatibility for a filter, for example, polyurethane, epoxy, polyethylene, polypropylene, commercial resin SU-8 (MICRO.CHEM), Ormocomp (Micro resist technology GmbH). For example, the curable resin may include but is not limited to uv curable resin or temperature curable resin. The curable resin 39 may be solidified by UV curing, temperature curing or other curing methods.

A plate 40 with a substantially flat surface (e.g. a glass plate) is positioned over the resin. In one embodiment, the curable resin is UV curable and is exposed to UV light for curing as pressure is exerted on a substantially transparent plate 40 (e.g. glass plate) as shown in FIG. 5(i). Pressure due to the weight of the plate and/or the pressure exerted may serve to minimize the thickness of the curable resin on top of the solvable mold 38. In an alternative embodiment, the curable resin is temperature curable resin and is exposed to a temperature suitable to cure the resin. The plate may also be substantially flexible or pliable such that it may be readily removed from the cured resin, for example, by peeling it off. Alternatively, the plate need not be flexible and/or pliable but may be substantially rigid and in this case, a flexible and/or pliable sheet may be placed in between the resin and the substantially rigid plate. After curing, the substantially rigid plate is removed and the flexible and/or pliable sheet is then peeled off the resin surface.

After the plate 40 has been removed, any excess resin layer above the pillars of the solvable mold 38 may be removed by any of several methods, including but not limited to plasma etching, chemical and/or mechanical polishing, mechanical milling (e.g. by using a milling cutter), sandblasting and chemical etching, to form the membrane filter 5 comprising a plurality of pores of substantially the same size. Due to the fabrication method, the pores are arranged in a substantially regular array (corresponding to the array of pillars in the solvable pillar mold). The porosity may be 5% to 80%. The size of the pores in the membrane filter is dependent on but may be slightly bigger than the size of the pillar molds. The size of the pores in the membrane filter can be fabricated precisely by engineering precisely the size of the pillars in the master mold, for example by controlling the thermal oxidation process described in Example 1 above. It can be understood that the size of the pores of the membrane filter may be precisely adapted to trap particles of different sizes during the fabrication process by making a master mold with pillars of appropriate dimensions. Accordingly, a membrane filter with precise pore sizes may be fabricated according to specification depending on requirements of the membrane filter. For example, for trapping *Cryptosporidium* which are in the range of 3-6 μm, a suitable pore size may be ~2 μm. For smaller organisms, the size of the pore may be reduced as appropriate. The diameter d of the pores of the membrane filter may, for example, be in the range of: $0.1\ \mu m = d = 100\ \mu m$.

The excess resin removal process may be performed to just expose the tops of the pillars of the solvable mold 38 so that the thickness of the membrane filter is substantially equal to the length of the pillars (FIG. 5(i)). Accordingly, membrane filter has a substantially even thickness t. In particular, t=500 μm.

As shown in FIG. 5(k), the surface of the membrane away from the solvable mold is then contacted with a first support. The surface of the membrane may be bonded to a first support in the form of a support grid 4 with openings 11 before the dissolution of the solvable mold. The support grid may be made of metal, plastic, paper or ceramic. Bonding the membrane filter to the first support provides additional strength to the membrane filter when in use.

As shown in FIG. 5(l), the solvable mold may be dissolved away in an appropriate solvent, leaving the membrane filter in contact or bonded to the support, as the case may be. If the solvable mold is soluble in water, it may be dissolved away in water.

For additional strengthening, the second surface of the membrane filter may be bonded to a second support as shown in FIG. 5(m). The second support may be in the form of a support grid 6 with openings 12 (similar to the first support grid 4).

An alternative embodiment is shown in FIG. 5(n), where during fabrication, the solvable mold is dissolved while the membrane filter 5 is in contact with the first support 4. The second support 6 need also not bonded to the membrane filter 5.

In FIG. 5(o), the first support 4 and the second support 6 are bonded to the membrane filter 5 after the dissolution of the solvable mold.

Figure 6:
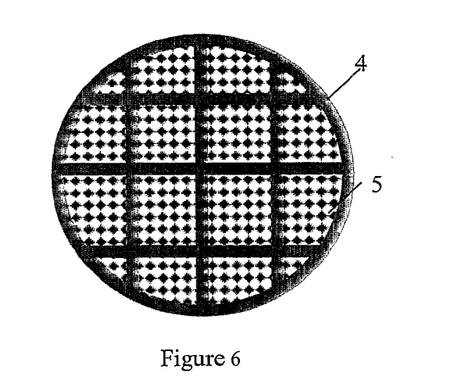
FIG. 6 depicts a top view of an example of a membrane filter with support grid.
Figure 7:
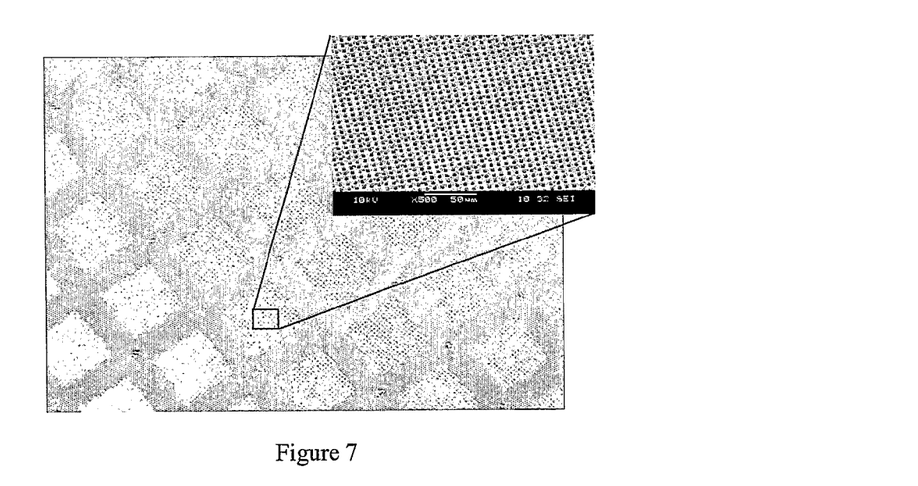
FIG. 7 depicts a magnification of an example of a membrane filter and support grid.

Each support grid typically comprises a network of horizontal and perpendicular tracks defining openings with the openings being larger than the opening of the pores of the membrane filter as shown in FIGS. 6 and 7.

EXAMPLE 3

Holding Device

Figure 1:
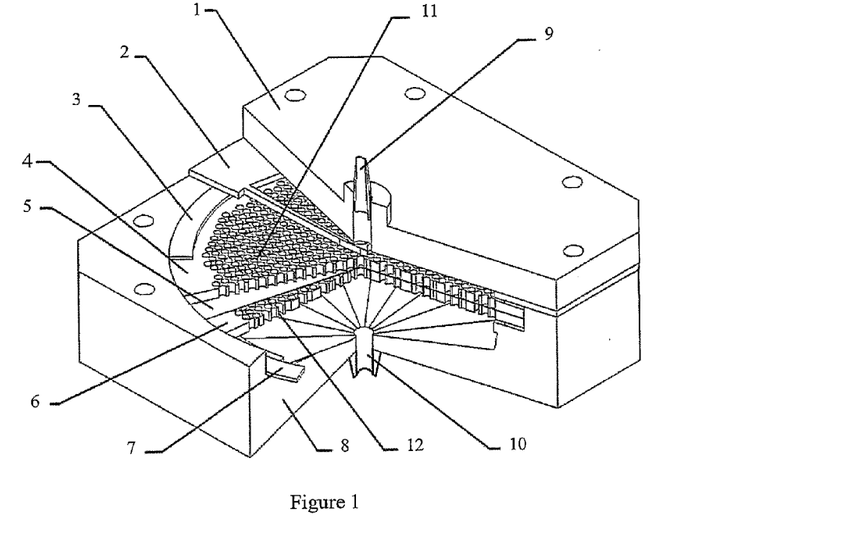
FIG. 1 depicts a perspective, cut-away view of an example of a holding device for a filter device.

The filter device comprising the membrane filter and the support grids may be part of a holding device designed to hold the filter device when in use. The holding device and the filter device may be used for trapping organisms, from fluids or liquids (e.g. a water sample). An embodiment of such a device is illustrated in FIG. 1. The openings 11 of the upper support grid 4 may be aligned with the openings 12 of the lower support grid 6. The lower support grid 6 is mounted on top of a base 8 with a gasket 7 in between to prevent leakage. The inner-upper surface of the base 8 may be shaped to facilitate liquid flow down and to reduce residue build-up. A lower opening 10 in the base 8 allows for inflow of the water sample and outflow of eluent (during back-flushing).

Figure 2:
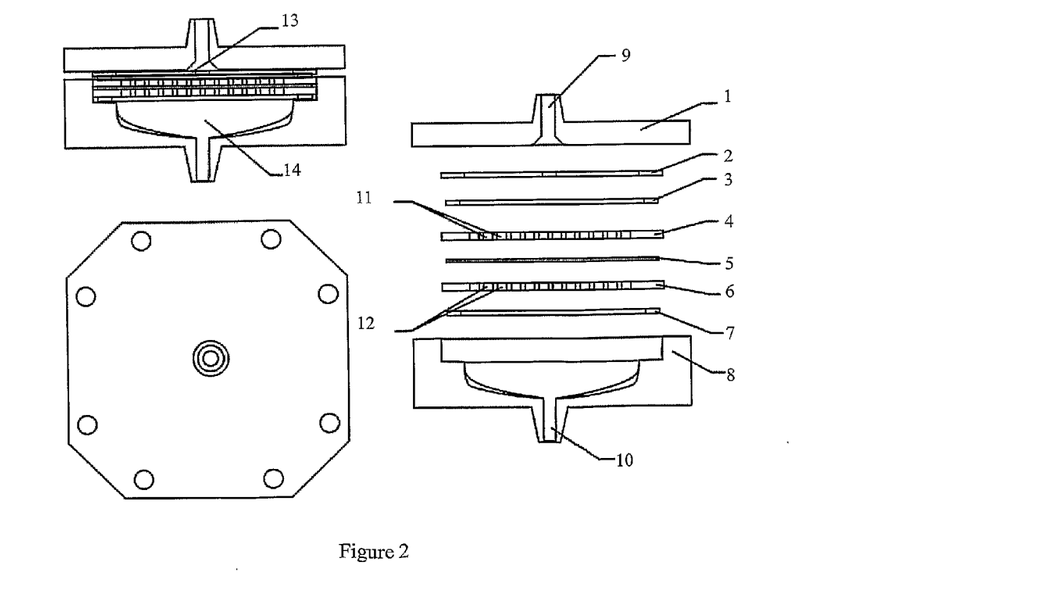
FIG. 2 depicts a plan view, cross-sectional side view and an exploded view of the holding device of FIG. 1.

A flow guide 2 is placed on top of the upper support grid 4, with a gasket 3 in between to prevent leakage. A lid 1 is fitted on top of the flow guide 2. In the lid 1 there is an upper opening 9 for outflow of the water sample and inflow of eluent (for backwashing). When the above members are fastened together, a lower chamber 14 is formed between the membrane filter 5 and the base 8, and an upper chamber 13 is formed between the lid 1 and the membrane filter 5, as shown in FIG. 2.

EXAMPLE 4

Filtration System for Trapping and Retrieving Particles

Figure 3:
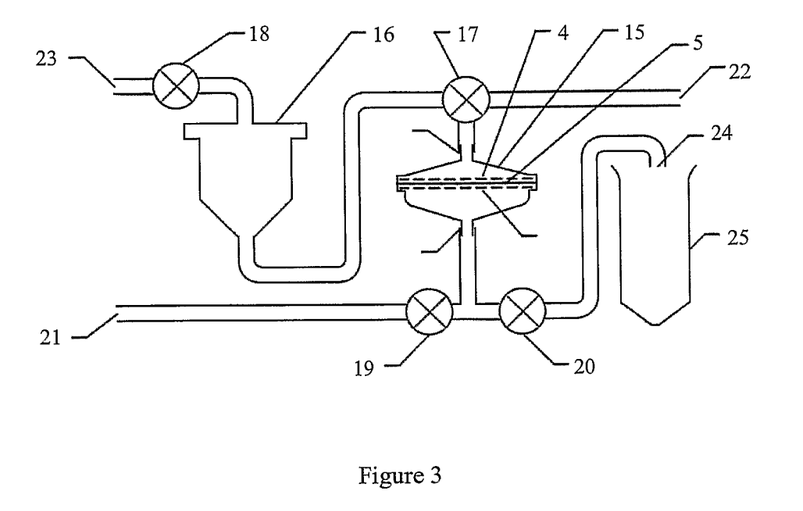
FIG. 3 depicts an example of a filtration system.
Figure 4:
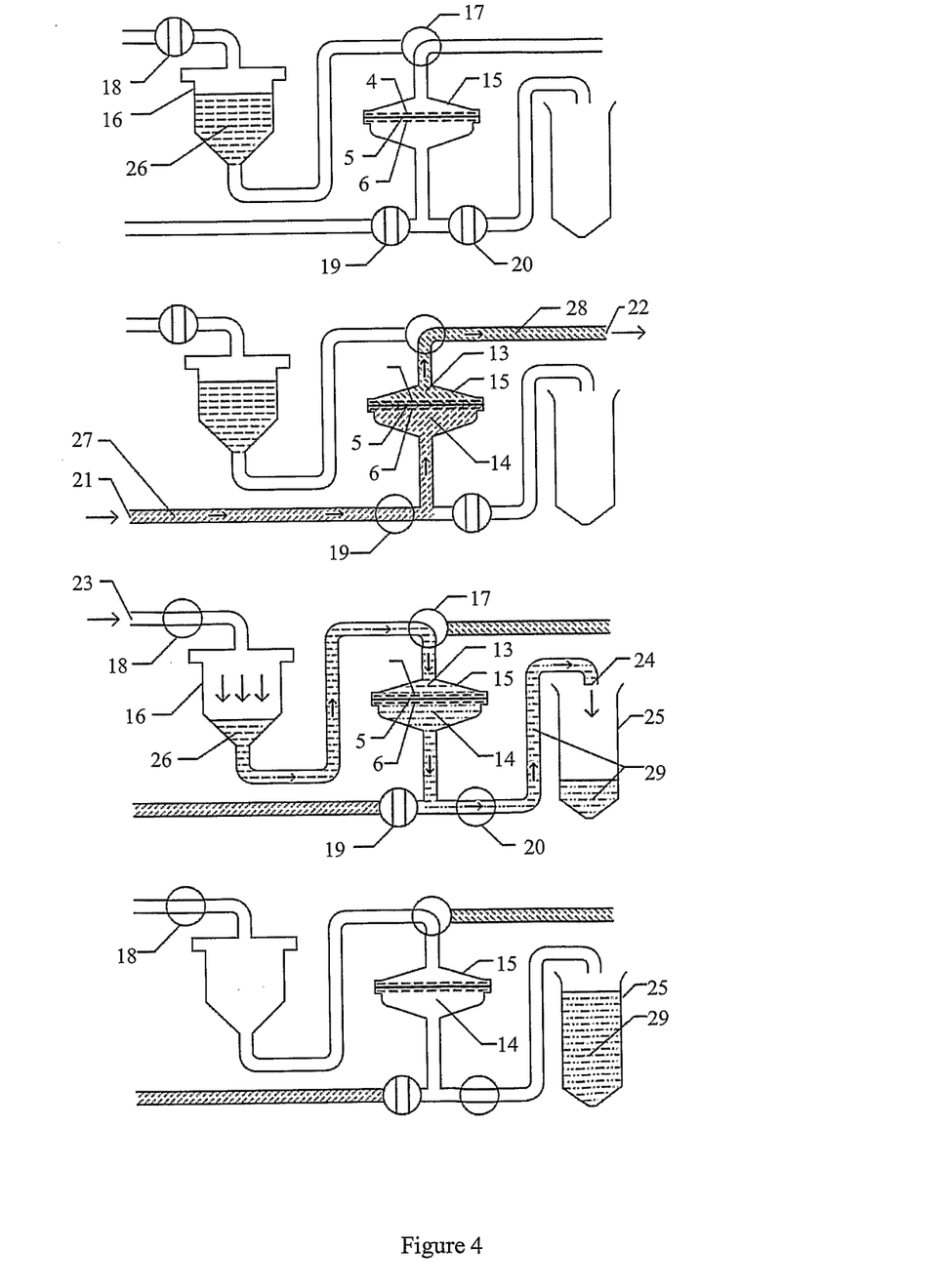
FIG. 4 illustrates the operation of the filtration system of FIG. 3.

The holding device 15 in turn may be part of a larger filtration system as illustrated in FIGS. 3 and 4. This filtration system is designed for trapping and retrieving particles. The holding device 15 including the membrane filter 5 and two support grids 4 and 6 is placed upright within the filtration system. The upper opening 9 of the device is coupled to a common port of a three-way valve 17. The left port of the three-way valve 17 is connected to a reservoir 16 through a tube. Compressed air is supplied to the system through air inlet 23. The air pressure is controlled with a valve 18, which is connected to the top of the reservoir 16. The right port of the 3-way valve 17 is coupled to an outlet 22.

The lower opening 10 of the holding device 15 is coupled to a T-junction which splits the liquid communication into two paths. One path communicates with a water sample inlet 21 with a valve 19, the other path leads to an outlet 24 for collection of a concentrated eluent 29 comprising particles into container 25. Flow through this outlet 24 is controlled by valve 20.

The operation of the filtration system is illustrated in FIG. 4(a) to (d). The holding device 15 comprising a round membrane filter 5 (e.g. of total diameter 47 mm) with pore size of 0.45 μm and two support grids 4 and 6 with 1 mm opening is placed upright within the filtration system and connected with valves 18, 19, 20 and 17 and a reservoir 16. A suitable amount (for example 10 ml) of liquid eluent 26 is loaded inside the reservoir 16. The two-way valves 18, 19 and 20 are closed and the three-way valve 17 is positioned with its right port open and its left port closed (FIG. 4(a)).

The next step is illustrated in FIG. 4(b), the valve 19 that regulates the incoming liquid sample is opened and the liquid sample 27 (e.g. water sample) enters through the sample inlet 21 and passes through the membrane filter 5 at a pressure of approximately 2-5 bar. The water may be introduced into the filtration system directly from the tap or via a water pump. The pressure of the water flow depends on the pressure of tap water or may be adjusted using the water pump. The membrane filter 5 does not bend or break under the pressure due to the upper support grid 4 and/or lower support grid 6. Particles, (e.g. organisms, pathogens etc) typically with a size larger than 0.45 μM, are blocked from passing into the upper chamber 13 by the membrane filter 5 and are retained in the lower chamber 14 of the holding device 15 and/or may accumulate on the membrane surface exposed to the openings of the lower support grid 6. In the upper chamber 13 of the holding device 15, the liquid passes through the membrane filter virtually particle free and exits out of the filtration system through the outlet 22. The "purified" liquid sample 28 may be collected on exit if required. In this step, 15 litres of liquid sample (e.g. tap water) may be passed through the membrane filter relatively quickly, such as in 20 minutes, with almost all particles (organisms, pathogens etc) trapped by the membrane filter 5 and/or retained in the lower chamber 14.

In the next step as illustrated in FIG. 4(c), the valve 19 controlling the incoming liquid sample is closed. The three-way valve 17 is turned to the left position, closing the right port and opening the left port. The valve 20 is opened. The pressure control valve 18 is opened and air (e.g. at a pressure of 2.5 bar) enters the reservoir 16 via air inlet 23 and forces the eluent 26 into the upper chamber 13 of the holding device 15. Within upper chamber 13, the eluent is guided through the openings of the upper support grid 4 and as the openings of the upper support grid 4 are aligned with the openings of the lower support grid 6, a jet flow of eluent is formed under pressure, and the eluent passing through the membrane filter 5, flushes down particles (organisms, pathogens etc) deposited on the pores of the membrane filter. The particles flushed down from the membrane filter 5 together with the particles retained in the lower chamber 14 form a concentrated eluent 29. This process is known as "back-flushing". As the eluent 26 is still being forced through by the air pressure, the concentrated eluent 29 exits the outlet 24 and is collected in container 25.

In the next step as illustrated in FIG. 4(d), all the remaining eluent 26 in the reservoir 16 is passed through the membrane filter 5 and expelled out of the holding device 15 as concentrated eluent 29 into the container 25. The lower chamber 14 is specially shaped allowing for the smallest possible chamber volume and yet able to facilitate complete elution of the concentrated eluent 29. The air pressure is maintained through the membrane filter for 2 minutes before the valve 18 is closed so as to ensure substantially complete collection of the entire concentrated eluent 29 in container 25. Typically, a total volume of 15 ml (10 ml of eluent+5 ml of liquid retained in the chambers of holding device 15 of concentrated eluent 29 is collected in container 25 and compared to input liquid sample volume of 15 litres, the concentration achieved is 1000 times.

The operation of the filtration system may be automated.

Figure 9:
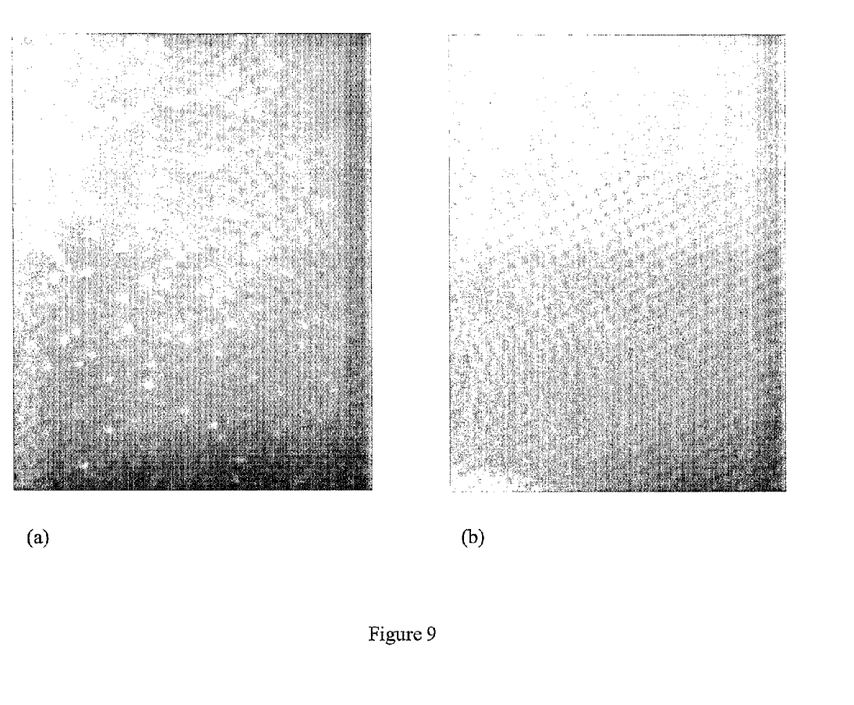
FIG. 9(a) depicts an example of the trapping of *Cryptosporidium* oocysts from a water sample on the membrane filter and FIG. 9(b) depicts the membrane filter after back-flushing.

The membrane filter may be reused after back-flushing (or alternatively after tangential or lateral shaking). FIG. 9(a) depicts the trapping of *Cryptosporidium* oocysts by the membrane filter from a test water sample deliberately seeded with *Cryptosporidium* oocysts. FIG. 9(b) depicts that the *Cryptosporidium* oocysts may be efficiently removed by back-flushing. Accordingly, the membrane filter may be re-used for repeat filtrations after back-flushing (or alternatively after tangential or lateral shaking).

The invention claimed is:

1. A method for preparing a filter device, comprising:
   (i) providing a solvable mold comprising an array of pillars of substantially the same size;
   (ii) depositing a curable resin layer on the solvable mold, curing the resin to form a membrane filter comprising an array of pores of substantially the same size in contact with the solvable mold;
   (iii) contacting at least a portion of a first surface of the membrane filter away from the mold to a first support; and
   (iv) dissolving away the solvable mold leaving the membrane filter in contact with the support;
   wherein the curable resin of step (ii) comprises a uv curable resin or a temperature curable resin and step (ii) comprises:
      (a) depositing the uv curable resin or temperature curable resin onto the solvable mold;
      (b) positioning a plate with a substantially flat surface over the uv curable resin or temperature curable resin and exerting pressure on the resin;
      (c) exposing the resin to UV light or a temperature suitable to cure the resin as appropriate; and
      (d) removing the plate and any excess resin to obtain a membrane filter with a substantially flat exposed first surface.

2. The method according to claim 1, further comprising bonding the first support to at least a portion of the first surface of the membrane filter.

3. The method according to claim 1, further comprising bonding at least a portion of a second surface of the membrane filter to a second support.

4. The method according to claim 3, wherein the portion(s) of the membrane in contact with the support(s) comprises a circumferential or peripheral portion(s) of the membrane.

5. The method according to claim 3 wherein the first and/or second support is substantially rigid and/or permeable to fluid or gas to or from the membrane filter.

6. The method according to claim 1, wherein step (i) comprises providing a through hole or blind hole mold wherein the holes are substantially the same size and using a solvable resin to cast the solvable mold from the through hole or blind hole mold.

7. The method according to claim 1, wherein the solvable mold is soluble in a solvent.

8. The method according to claim 7, wherein the solvent is water.

* * * * *

UNITED STATES PATENT AND TRADEMARK OFFICE
CERTIFICATE OF CORRECTION

| | | |
|---|---|---|
| PATENT NO. | : 8,758,542 B2 | Page 1 of 1 |
| APPLICATION NO. | : 13/260235 | |
| DATED | : June 24, 2014 | |
| INVENTOR(S) | : Haiqing Gong et al. | |

It is certified that error appears in the above-identified patent and that said Letters Patent is hereby corrected as shown below:

Title Page

Item (22) PCT Filed:

Delete "Nov. 9, 2009" and insert --Nov. 26, 2009-- therefor.

Signed and Sealed this
Twenty-eighth Day of October, 2014

Michelle K. Lee
*Deputy Director of the United States Patent and Trademark Office*